Patented Mar. 22, 1938

2,111,756

UNITED STATES PATENT OFFICE 2,111,756

MANUFACTURE OF NAPHTHOSTYRIL AND 8-AMINO-1-NAPHTHOIC ACID

Arnaldo Corbellini, Milan, Italy

No Drawing. Application June 7, 1934, Serial No. 729,474. In Italy June 19, 1933

4 Claims. (Cl. 260—109)

It is well known that the 8-amino-1-naphthoic acid and naphthostyril have been hitherto prepared either by reducing 8-nitro-1-naphthoic acid or by the action of alkaline hypochlorites and hypobromites on naphthalimide, or else by causing 8-cyan-1-naphthalene sulphonic acid to react with alkaline hydrates.

According to the present invention, the 8-amino-naphthoic acid and naphthostyril can be obtained with high efficiencies by treating the 8-halogen 1-naphthoic (8-chloro-, 8-bromo-, 8-iodo-, 1-naphthoic acids) with aminating agents, for instance with ammonia, sodium amide and the like, either in the presence or not of copper dust or copper salts added at the beginning of the process, while operating under atmospheric pressure or under higher pressures.

The product of this reaction can be further manipulated in various ways according to the result to be obtained, either 8-amino-1-naphthoic acid or naphthostyril being obtainable.

By treating in the same manner the nuclear-substituted derivatives of the above named 8-halogen-1-naphthoic acids, it is possible to obtain the corresponding nuclear-substituted derivatives of the 8-amino-1-naphthoic acid and the corresponding substituted derivatives of the naphthostyril.

Example.—5 parts of 8-bromo-1-naphthoic acid are dissolved in 12 parts of 30% ammonia and the solution warmed under pressure at 150° C. for 2 to 5 hours.

The yellow-green crystals of naphthostyril thus obtained can be withdrawn directly from the liquid or else by warming the reacting mixture with diluted hydrate of soda all the naphthostyril can be caused to pass into solution.

From the filtered solution 8-amino-1-naphthoic acid can be obtained by acidifying with acetic acid, or the naphthostyril can be obtained by acidifying the same boiling solution with hydrochloric acid.

In such a case, on cooling, the naphthostyril separates in acicular yellow-greenish crystals. The product thus obtained is practically pure (with a melting point of 175°–179° C. as against 181° C. of the pure compound). The efficiency of the reaction varies from 90 to 97% of the theoretical value.

What I claim is:

1. A process for manufacturing a variable mixture of naphthostyril with 8-amino-1-naphthoic acid, consisting in treating an 8-halogen-1-naphthoic acid with an aminating agent under the action of heat and superatmospheric pressure.

2. A process for manufacturing a variable mixture of naphthostyril with 8-amino-1-naphthoic acid, consisting in treating an 8-halogen-1-naphthoic acid with an aminating agent under the action of heat and superatmospheric pressure in the presence of a copper catalyst selected from the group consisting of copper dust and copper salt.

3. A process for manufacturing a variable mixture of naphthostyril with 8-amino-1-naphthoic acid, consisting in treating an 8-halogen-1-naphthoic acid with an aminating agent under the action of heat.

4. A process for manufacturing a variable mixture of naphthostyril with 8-amino-1-naphthoic acid consisting in treating an 8-halogen-1-naphthoic acid with an aminating agent under the action of heat and atmospheric pressure in the presence of a copper catalyst selected from the group consisting of copper dust and copper salt.

ARNALDO CORBELLINI.